Patented Mar. 27, 1951

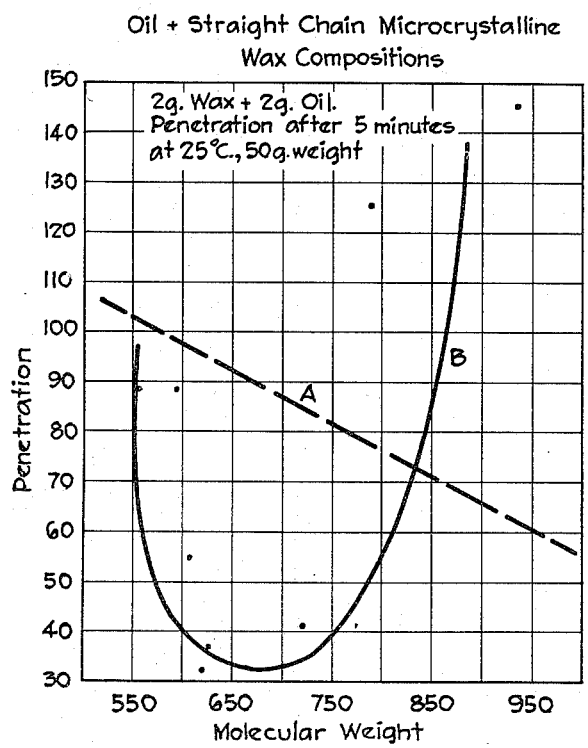

2,546,328

UNITED STATES PATENT OFFICE 2,546,328

CARNAUBA WAX SUBSTITUTE

Karekin G. Arabian, El Cerrito, and August A. Schaerer, Berkeley, Calif., assignors to Shell Development Company, San Francisco, Calif., a corporation of Delaware Application September 27, 1948, Serial No. 51,454

8 Claims. (Cl. 106—271)

This invention relates to the production of microcrystalline hydrocarbon waxes having properties similar to those of carnauba wax and other natural waxes.

Carnauba wax is used in a great variety of compositions, such as paste polishes, floor wax emulsions, felt hat impregnants and for many other purposes. Due to the uncertainty of supply and the varying nature of the product, as well as its relatively high cost, a number of substances have been suggested as substitutes. In general, these proposed substitutes may have one or another of the properties possessed by carnauba wax and the like but usually fail to satisfactorily replace the ester waxes in the more important uses.

Other waxes of the so-called "microcrystalline wax" class may be obtained from sources such as residual petroleum oils or from separated waxes in crude oil tank bottoms. Microcrystalline waxes from such sources as these have the property of oil binding or oil retention. It must be emphasized, however, that the result is similar to a sponge that soaks up water, in that microcrystalline waxes containing appreciable amounts of oil resemble Vaseline or petrolatum; in other words, the solvent properties of ordinary microcrystalline wax and oil are such that hard, waxy compositions are not formed.

As opposed to this phenomenon, of sponge-like retention of oil, carnauba wax and similar vegetable waxes exhibit the property of forming hard, waxy composition with lubricating oils even when the latter are present in amounts up to about 50% or even higher. This difference in solubility characteristics with oil is an essential property for such uses as in carbon papers which ordinarily excludes the substitution of major amounts of petroleum microcrystalline waxes in compositions employing carnauba wax.

Carnauba wax substitutes have been prepared by a particular type of oxidation of microcrystalline wax which apparently results in the formation of a mixture of oxygen-containing components, an appreciable part of which are believed to be high-molecular weight esters; however, the process is uneconomical and relatively cumbersome.

It is an object of the present invention to provide a process for the preparation of substitutes for carnauba wax and the like. It is another object of the invention to provide a process for the fractionation of residual or microcrystalline waxes. It is a further object of this invention to provide a novel type of wax suitable for use in floor polish compositions, wax emulsions, paste wax compounds and the like. Other objects will become apparent during the following discussion.

Now, in accordance with this invention, it has been found that straight-chain microcrystalline hydrocarbon waxes possess the unexpected property of forming hard, fine-grained compositions with mineral oil similar to those prepared from carnauba wax. Still in accordance with this invention, and due to the above unpredictable property, straight-chain microcrystalline waxes make excellent carnauba wax substitutes in either paste polishes or emulsions.

These straight-chain microcrystalline waxes may be isolated by treatment of a solution of residual waxes with urea, whereby crystalline clathrate compounds are formed between urea and the straight-chain wax. While these clathrate compounds are useful as additives to other waxes, the straight-chain waxes are ordinarily regenerated as described hereinafter.

Another aspect of this invention comprises the utility of these straight-chain residual waxes in the air-blowing of asphalt. According to the process of the invention, the inclusion of a minor amount of straight-chain residual waxes in asphalt during air-blowing results in a very substantially reduced blowing time to reach a given penetration. Moreover, the penetration index of the blown compositions is considerably better than asphalts blown in the absence of the waxes.

THE CRUDE WAX SOURCE

The crude microcrystalline waxes from which the straight-chain waxes of the present invention are obtained include especially those found in waxy petroleum residues and in crude oil tank bottoms. In general, microcrystalline petroleum waxes have melting points of between about 40° C. and about 88° C. These waxes are believed to include high molecular weight hydrocarbons having a minimum molecular weight of 500. They include straight-chain hydrocarbons, branched-chain hydrocarbons and cyclic aliphatic hydrocarbons. It is well known that the microcrystalline waxes having the above minimum molecular weight differ greatly in their physical characteristics from ordinary paraffin waxes which are obtained from petroleum distillates.

Most microcrystalline waxes possess noticeable adhesiveness and tackiness. Many of those commonly employed in industry have a melting point range of between 40° C. and about 88° C., which is higher than many of the melting points of the normal paraffin waxes used commercially. Microcrystalline petroleum wax usually has about the same boiling point for a given molecular weight as the non-amorphous paraffin wax, in which case the melting point of the former is usually much lower than that of the latter. The separation of microcrystalline or amorphous waxes from residual lubricating oils may be carried out by methods well known in the art.

The microcrystalline waxes described above are those which are considered to be the principal sources of the straight-chain amorphous waxes which form the subject of the present invention.

PROCESS OF FRACTIONATION

The process by which the straight-chain microcrystalline waxes are separated from the crude microcrystalline waxes described hereinbefore comprises treatment of the latter with urea. Crystalline molecular complexes known as "clathrate compounds" are formed between the straight-chain components of the microcrystalline wax and urea. These clathrate compounds crystallize and may be readily separated from the unaffected portions of the wax, the components other than the crystalline clathrate compounds being either in a fluid state or in solution.

Urea is preferably contacted with crude microcrystalline waxes at a temperature from about 25° C. to about 100° C. The wax is preferably dissolved in a solvent such as methyl isobutyl ketone or a similar oxygenated solvent such as other ketones or aldehydes or ethers. The urea is preferably dissolved in an aqueous solvent which may contain modifying ingredients such as alcohols having one to five carbon atoms. Secondary butyl alcohol is a preferred species of this variety. A preferred procedure comprises contacting a solution of microcrystalline wax in methyl isobutyl ketone with a saturated aqueous solution of urea, the urea solution being saturated at the temperature of contacting.

Subsequent to the formation of the crystalline complexes of urea and straight-chain microcrystalline waxes, as described above, the reaction mixture is subjected to separation procedures such as filtration or centrifuging. This operation separates the complexes from the unaffected portion of the original microcrystalline wax. The resulting products are described below.

UREA COMPLEXES WITH STRAIGHT-CHAIN AMORPHOUS WAXES

The urea complexes formed as described above comprise loosely-bound crystalline systems of molecular urea and the wax, the proportion of urea to wax being approximately somewhat less than one molecule of urea for each carbon atom of the wax. It has been determined that the wax components of the complex comprise at least 90% straight-chain microcrystalline waxes together with a balance of other types of waxes. The complexes are useful without further modification for various purposes such as additives for wax compositions in modifying their structure and improving their resistance to heating and oxidation.

The complexes may be readily regenerated into the wax and urea components by the use of heat, especially in the presence of water and steam. Heating in the presence of a wax solvent also causes destruction of the complex and subsequent regeneration of the wax and urea.

STRAIGHT-CHAIN MICROCRYSTALLINE WAXES

The straight-chain microcrystalline waxes obtained from ordinary petroleum microcrystalline wax as described above are understood to have a purity of at least 90% straight-chain material, the balance being principally either branched-chain hydrocarbons or cyclic aliphatic hydrocarbons. Dependent upon original mixture of microcrystalline waxes, the resulting straight-chain amorphous waxes have molecular weights within the range from about 500 to about 900. They have melting points from about 55° C. to about 90° C. It has been found that a critical molecular weight range exists within which hard compositions are formed between waxes and mineral oils. This is shown by the graph accompanying the present specification. By the process described in Example II, given hereafter, straight-chain microcrystalline wax was fractionated according to molecular weight by fractional precipitation from methyl isobutyl ketone. In order to determine the hardness characteristics of each of the fractions so obtained, they were mixed with an equal amount of a heavy-weight mineral oil. The penetration of each of these compositions was tested in a standard asphalt penetrometer, using a 50-gram weight on the needle, the penetration being taken after five seconds at 25° C.

It would be expected that results would lie along the dotted line A, as shown in the graph, since one would normally expect increasing hardness of composition with increasing molecular weight. However, it was discovered that the composition using straight-chain microcrystalline waxes having from 600 to 750 molecular weight were much harder than the compositions containing straight-chain microcrystalline waxes of either higher or lower molecular weights. For comparison with the data shown, an ordinary paraffin wax having a molecular weight of about 350 had a penetration greater than 140 when mixed with the same oil. Furthermore, unfractionated microcrystalline wax having an average molecular weight of 750 also gave a penetration greater than 140 in the same test. It is clear, therefore, that the straight-chain microcrystalline waxes are especially valuable as carnauba wax substitutes when the majority thereof have molecular weights within the range of 600 to 750.

The essential characteristic which distinguishes the straight-chain microcrystalline waxes from the mixture of microcrystalline waxes obtained from residual oils is their ability to form hard, waxy compositions with oils similar to those prepared from carnauba wax. The melting point, gloss characteristics and particularly their special solubility characteristics with oils of lubricating viscosity make it possible to use these products as effective substitutes for carnauba wax and similar ester waxes, especially when the composition comprises 30–70 parts each of a mineral oil and the straight-chain microcrystalline wax.

COMMERCIAL PRODUCTS

Paste-type polishes may be prepared from the straight-chain microcrystalline waxes described above. These will preferably contain from about 20% to 40% of the straight-chain waxes, together with a mixture of solvents usually comprising turpentine, kerosene and gasoline; these polishes may also contain dyes or other coloring materials in addition to dispersing agents such as triethanolamine.

Emulsion-type floor waxes also may be prepared from the straight-chain waxes described above. These emulsions comprise 5–30% of the straight-chain amorphous waxes together with vegetable oil acids such as linseed oil fatty acids and an emulsifying agent. The preferred agents for emulsification include trihydroxyalkylamines, such as triethanolamine and resinous compounds such as the soaps of petroleum hydrocarbon insoluble pine wood resins. Other emulsifying and stabilizing agents such as soaps, clay and the like may be employed.

Another excellent use for the straight-chain microcrystalline waxes described above comprises the spraying of fruits and vegetables for preservation and saleability. These coating waxes are preferably in emulsified form, and their formulation conforms, in a general way, to the dry-bright type of floor waxes. Suitable emulsifying agents for emulsions of this character include combinations of fatty acid soaps and hydroxyalkylamines. The wax is preferably present in amounts from about 10% to about 25% by weight, the major part of the balance being water and emulsifying agent. Carbon paper compositions are improved by the use of straight-chain microcrystalline waxes.

The high molecular weights of the straight-chain microcrystalline waxes described above permit the formation by oxidation of extremely long-chain fatty acids and the corresponding alcohols and ketones, as well as nitriles, amines and amides. These high molecular weight materials are especially valuable as emulsifying agents and for special purposes such as the improvement in the adhesion characteristics of asphalt compositions and aggregates. The high molecular weight of the derived products results in a maximum adhesion effect being obtained.

The inclusion of 5-20% of straight-chain microcrystalline waxes in asphalt during a blowing operation permits a substantial reduction in blowing time to reach a given penetration, and, furthermore, results in a surprising improvement in penetration index. The results obtained are far greater than those when whole microcrystalline wax is used in combination with asphalt. The difference may be attributed to the special solubility characteristics which the straight-chain amorphous waxes exhibit toward other hydrocarbon materials.

The following examples illustrate the extraction of straight-chain microcrystalline waxes from a whole residual wax and describe its fractionation and use.

EXAMPLE I

A residual wax having a melting point of 68° C. and having a soft, sticky composition was dissolved in methyl isobutyl ketone to form a five-per-cent solution. This solution was heated to 55°-60° C. An amount of urea complexes was added for the purpose of "seeding" after which a saturated aqueous urea solution was added to the reaction mixture. After a few minutes, large amounts of the crystalline urea wax complex precipitated and were removed by a filtration.

In order to recover the extracted wax from the crystalline complexes, the latter was warmed to about 90° C. in the presence of water. The complexes decomposed, and the regenerated urea dissolved in the water while the melted wax rose above the top of the aqueous layer. Approximately 10% of the original wax was extracted by the above process.

EXAMPLE II

Five-hundred and thirty grams of the straight-chain microcrystalline waxes obtained as described in Example I were dissolved in methyl isobutyl ketone to form a one-per-cent solution. This solution was progressively cooled, and the precipitated waxes obtained at various stages were removed by filtration. The table below gives the melting point and molecular weight of each of the fractions obtained.

Table 1

| Fraction | Amount (grams) | Melting Point, °C. | Molecular Weight |
| --- | --- | --- | --- |
| 1 | 30 | 101 | 935 |
| 2 | 55 | 96 | 787 |
| 3 | 110 | 92 | 723 |
| 4 | 110 | 87 | 620 |
| 5 | 75 | 83 | 625 |
| 6 | 80 | 77 | 607 |
| 7 | 20 | 72 | 596 |
| 8 | 30 | 64 | 554 |

EXAMPLE III

Thirty-five parts by weight of straight-chain microcrystalline wax were mixed with sixty-five parts by weight of a hydrocarbon paint thinner having a boiling range of 300°-400° F. and containing 70% aromatics. The mixture was warmed to 80° C. to dissolve the wax in the thinner and then was cooled to room temperature to form a paste-type wax polish. The paste gave a glossy surface similar to a carnauba wax paste polish, and showed excellent resistance to water staining.

The whole microcrystalline wax from which these straight-chain waxes were prepared exhibited the property of forming a soft, sticky composition when mixed with the paint thinner, as described above.

EXAMPLE IV

Ten to twenty parts by weight of carnauba wax were mixed with 100 parts by weight of an ester containing at least eighteen carbon atoms in both the acid and alcoholic radicals, such as octadecylstearate. The products obtained were not homogeneous, and the crystal size was relatively large. Addition of one to ten parts by weight of straight-chain microcrystalline wax to a melted mixture of the above ingredients, followed by cooling to room temperature, gave a dense, homogeneous, hard wax of fine crystals with good luster having properties closely resembling carnauba wax.

We claim as our invention:

1. A carnauba wax composition substitute consisting essentially of 30-70 per cent each of a mineral oil of lubricating oil viscosity and of a mixture of straight-chain microcrystalline hydrocarbon waxes, the molecular weights of which are from 550 to 900, the major portion of which have molecular weights from 600 to 750.

2. A carnauba wax composition substitute consisting essentially of 30-70 parts each of a mineral oil and of a mixture of straight-chain microcrystalline hydrocarbon waxes having a molecular weight from 600 to 750.

3. An aqueous wax emulsion of the oil-in-water type comprising 5-30% by weight of straight-chain microcrystalline hydrocarbon waxes having molecular weights from 550 to 900 as the principal and essentially only hydrocarbon wax constituent thereof, a water-soluble emulsifying agent and a major amount of water constituting the continuous phase.

4. A wax composition comprising 10-20% carnauba wax, 1-10% straight-chain microcrystalline hydrocarbon waxes having molecular weights from 550 to 900, the balance being an ester of a monohydric aliphatic alcohol and a fatty acid, both of which contain at least 18 carbon atoms.

5. A carnauba wax composition substitute comprising 30-70 parts each of a mineral lubricating oil and a wax, at least 90% of said wax being a mixture of microcrystalline straight-chain hydrocarbon waxes having molecular weights ranging all the way from 550 to 900, the balance of said wax being non-straight-chain microcrystalline wax.

6. A composition of matter suitable for use as a carnauba wax substitute consisting essentially of at least 90% of a mixture of straight-chain microcrystalline hydrocarbon waxes having molecular weights ranging from 550 to 900, the balance being non-straight-chain microcrystalline wax, said mixture forming hard, non-bleeding compositions with hydrocarbon oils having lower penetration values than of said wax mixture alone and being isolated from mixtures of microcrystalline waxes, the latter mixtures forming soft, sticky compositions with hydrocarbon oils and containing greater than 10% of non-straight-chain microcrystalline waxes.

7. A hydrocarbon wax composition suitable for use as a carnauba wax substitute consisting essentially of at least 90% of a mixture of straight-chain microcrystalline hydrocarbon waxes having molecular weights ranging from 550 to 900, the major portion of which have molecular weights from 600 to 750, the balance being non-straight-chain microcrystalline wax, said mixture forming hard, non-bleeding compositions with hydrocarbon oils having lower penetration values than of said wax mixture alone and being isolated from mixtures of microcrystalline waxes, the latter mixtures forming soft, sticky compositions with hydrocarbon oils and containing greater than 10% of non-straight-chain microcrystalline waxes.

8. A hydrocarbon wax composition suitable for use as a carnauba wax substitute consisting essentially of at least 90% of a mixture of straight-chain microcrystalline hydrocarbon waxes having molecular weights ranging from 600 to 750, the balance being non-straight-chain microcrystalline wax, said mixture forming hard, non-bleeding compositions with hydrocarbon oils having lower penetration values than of said wax mixture alone and being isolated from mixtures of microcrystalline waxes, the latter mixtures forming soft, sticky compositions with hydrocarbon oils and containing greater than 10% of non-straight-chain microcrystalline waxes.

KAREKIN G. ARABIAN.
AUGUST A. SCHAERER.

REFERENCES CITED

The following references are of record in the file of this patent:

UNITED STATES PATENTS

| Number | Name | Date |
|---|---|---|
| 2,244,705 | Hutchinson | June 10, 1941 |
| 2,298,844 | Schilling et al. | Oct. 13, 1942 |
| 2,348,689 | Abrams et al. | May 9, 1944 |
| 2,456,595 | Rood | Dec. 14, 1948 |

OTHER REFERENCES

Bengen: Technical Oil Mission Reel, page 4, May 22, 1946.